United States Patent
Fanning et al.

(10) Patent No.: US 6,742,023 B1
(45) Date of Patent: May 25, 2004

(54) USE-SENSITIVE DISTRIBUTION OF DATA FILES BETWEEN USERS

(75) Inventors: Shawn Fanning, San Mateo, CA (US); John Fanning, Hull, CA (US); Edward Kessler, Los Gatos, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/560,106

(22) Filed: Apr. 28, 2000

(51) Int. Cl.⁷ .............................................. G06F 15/16
(52) U.S. Cl. ........................ 709/219; 709/217; 709/203
(58) Field of Search ............................... 709/217, 219, 709/203, 224; 707/10, 2, 1; 717/168–178

(56) References Cited

U.S. PATENT DOCUMENTS

| | | | |
|---|---|---|---|
| 4,506,387 A | 3/1985 | Walter | 455/612 |
| 4,616,263 A | 10/1986 | Eichelberger | 358/185 |
| 4,648,123 A | 3/1987 | Schrock | 455/67 |
| 4,745,559 A | 5/1988 | Willis et al. | 364/514 |
| 4,766,581 A | 8/1988 | Korn et al. | 369/30 |
| 4,769,833 A | 9/1988 | Farleigh et al. | 379/105 |
| 4,844,679 A | 7/1989 | Teranishi | 414/331 |
| 4,867,628 A | 9/1989 | Ammon et al. | 414/273 |
| 4,891,720 A | 1/1990 | Grant et al. | 360/92 |
| 4,893,307 A | 1/1990 | McKay et al. | 370/94.1 |
| 4,961,139 A | 10/1990 | Hong et al. | 364/200 |
| 5,014,125 A | 5/1991 | Pocock et al. | 358/86 |
| 5,093,718 A | 3/1992 | Hoarty et al. | 358/84 |
| 5,101,488 A | 3/1992 | Rosenthal et al. | 395/425 |
| 5,132,789 A | 7/1992 | Ammon et al. | 358/86 |
| 5,133,065 A | 7/1992 | Cheffetz et al. | 395/575 |
| 5,133,079 A | 7/1992 | Ballantyne et al. | 455/4.1 |
| 5,192,999 A | 3/1993 | Graczyk et al. | 358/85 |
| 5,220,420 A | 6/1993 | Hoarty et al. | 358/86 |
| 5,224,205 A | 6/1993 | Dinkin et al. | 395/200 |
| 5,233,346 A | 8/1993 | Minerd et al. | 340/825.52 |
| 5,357,276 A | 10/1994 | Banker et al. | 348/7 |

(List continued on next page.)

FOREIGN PATENT DOCUMENTS

EP   0 877 326 A2 * 11/1998  ........... G06F/17/30

OTHER PUBLICATIONS

Byers et al. "Accessing Multiple Mirror Sites in Parallel: Using Tornado Codes to Speed Up Downloads", IEEE Communications, vol. 1, Mar. 21–25, 1999, Page(s): 275–283 vol. 1.*

(List continued on next page.)

Primary Examiner—David Wiley
Assistant Examiner—Joseph E. Avellino
(74) Attorney, Agent, or Firm—Martine & Penilla, LLP (57) ABSTRACT

The invention contained herein describes a use-sensitive system for distribution of data files between users in a networked community of users. The system comprises each user having a distribution application that has at least one data file repository that has the ability to store at least one data file. The distribution application additionally includes a data file transfer server which makes available all data files located in the data file repository for download by other users, a file transfer client, and a user interface for displaying the actions and status of the distribution application to the user. In the system the file transfer client connects to the file transfer server and downloads a data file, and when the downloaded file is placed in the repository, the distribution application automatically makes available the downloaded data file to other distribution applications in the community of users.

51 Claims, 9 Drawing Sheets

U.S. PATENT DOCUMENTS

| | | | |
|---|---|---|---|
| 5,392,400 A | 2/1995 | Berkowitz et al. | 395/200 |
| 5,410,343 A | 4/1995 | Coddington et al. | 348/7 |
| 5,430,877 A * | 7/1995 | Naylor | 709/221 |
| 5,497,502 A | 3/1996 | Castille | 455/5.1 |
| 5,528,281 A | 6/1996 | Grady et al. | 348/7 |
| 5,544,352 A | 8/1996 | Egger | 395/600 |
| 5,570,126 A | 10/1996 | Blahut et al. | 348/7 |
| 5,608,447 A | 3/1997 | Farry et al. | 348/7 |
| 5,617,539 A | 4/1997 | Ludwig et al. | 395/200.02 |
| 5,625,404 A | 4/1997 | Grady et al. | 348/7 |
| 5,635,979 A | 6/1997 | Kostreski et al. | 348/13 |
| 5,675,819 A | 10/1997 | Schuetze | 395/760 |
| 5,701,469 A | 12/1997 | Brandli et al. | 395/613 |
| 5,712,906 A | 1/1998 | Grady et al. | 379/93.17 |
| 5,715,395 A | 2/1998 | Brabson et al. | 395/200.13 |
| 5,734,961 A | 3/1998 | Castille | 455/5.1 |
| 5,737,532 A | 4/1998 | DeLair et al. | 395/200.49 |
| 5,754,784 A | 5/1998 | Garland et al. | 395/200.49 |
| 5,754,938 A | 5/1998 | Herz et al. | 455/4.2 |
| 5,764,982 A | 6/1998 | Madduri | 395/680 |
| 5,778,185 A | 7/1998 | Gregerson et al. | 395/200.56 |
| 5,778,363 A | 7/1998 | Light | 707/5 |
| 5,778,368 A | 7/1998 | Hogan et al. | 707/10 |
| 5,784,562 A | 7/1998 | Diener | 395/200.47 |
| 5,794,178 A | 8/1998 | Caid et al. | 704/9 |
| 5,794,249 A | 8/1998 | Orsolini et al. | 707/104 |
| 5,796,393 A | 8/1998 | MacNaughton et al. | 345/329 |
| 5,806,065 A | 9/1998 | Lomet | 707/8 |
| 5,845,070 A | 12/1998 | Ikudome | 395/187.01 |
| 5,848,410 A | 12/1998 | Walls et al. | 707/4 |
| 5,857,179 A | 1/1999 | Vaithyanathan et al. | 707/2 |
| 5,870,744 A | 2/1999 | Sprague | 707/9 |
| 5,877,755 A | 3/1999 | Hellhake | 345/327 |
| 5,878,410 A | 3/1999 | Zbikowski et al. | 707/2 |
| 5,884,035 A | 3/1999 | Butman et al. | 395/200.48 |
| 5,884,305 A | 3/1999 | Kleinberg et al. | 707/6 |
| 5,903,892 A | 5/1999 | Hoffert et al. | 707/10 |
| 5,920,854 A | 7/1999 | Kirsch et al. | 707/3 |
| 5,920,859 A | 7/1999 | Li | 707/5 |
| 5,926,811 A | 7/1999 | Miller et al. | 707/5 |
| 5,931,907 A | 8/1999 | Davies et al. | 709/218 |
| 5,956,711 A | 9/1999 | Sullivan et al. | 707/6 |
| 5,960,194 A | 9/1999 | Choy et al. | 395/613 |
| 5,960,404 A | 9/1999 | Chaar et al. | 705/8 |
| 5,963,944 A * | 10/1999 | Adams | 709/202 |
| 5,963,957 A | 10/1999 | Hoffberg | 707/104 |
| 5,966,139 A | 10/1999 | Anupam et al. | 345/440 |
| 5,966,703 A | 10/1999 | Burrows | 707/2 |
| 5,970,464 A | 10/1999 | Apte et al. | 705/4 |
| 5,974,409 A | 10/1999 | Sanu et al. | 707/3 |
| 5,974,412 A | 10/1999 | Hazlehurst et al. | 707/3 |
| 5,983,218 A | 11/1999 | Syeda-Mahmood | 707/3 |
| 5,987,376 A | 11/1999 | Olson et al. | 701/201 |
| 5,987,454 A | 11/1999 | Hobbs | 707/4 |
| 5,987,464 A | 11/1999 | Schneider | 707/10 |
| 6,003,041 A | 12/1999 | Wugofski | 707/104 |
| 6,005,860 A | 12/1999 | Anderson et al. | 370/352 |
| 6,006,221 A | 12/1999 | Liddy et al. | 707/5 |
| 6,006,223 A | 12/1999 | Agrawal et al. | 707/5 |
| 6,006,225 A | 12/1999 | Bowman et al. | 707/5 |
| 6,012,096 A | 1/2000 | Link et al. | 709/233 |
| 6,018,745 A * | 1/2000 | Kuftedjian | 707/200 |
| 6,026,409 A | 2/2000 | Blumenthal | 707/104 |
| 6,029,195 A | 2/2000 | Herz | 709/219 |
| 6,032,129 A | 2/2000 | Greef et al. | 705/27 |
| 6,038,560 A | 3/2000 | Wical | 707/5 |
| 6,044,374 A | 3/2000 | Nesamoney et al. | 707/10 |
| 6,044,376 A | 3/2000 | Kurtzman, II | 707/102 |
| 6,052,784 A | 4/2000 | Day | 713/201 |
| 6,055,513 A | 4/2000 | Katz et al. | 705/26 |
| 6,055,568 A | 4/2000 | Adams | 709/221 |
| 6,064,980 A | 5/2000 | Jacobi et al. | 705/26 |
| 6,067,552 A * | 5/2000 | Yu | 707/5 |
| 6,070,158 A | 5/2000 | Kirsch et al. | 707/3 |
| 6,076,108 A | 6/2000 | Courts et al. | 709/227 |
| 6,078,892 A | 6/2000 | Anderson et al. | 705/10 |
| 6,078,913 A | 6/2000 | Aoki et al. | 707/2 |
| 6,085,193 A * | 7/2000 | Malkin et al. | 709/200 |
| 6,085,223 A | 7/2000 | Carino, Jr. et al. | 709/203 |
| 6,092,074 A | 7/2000 | Rodkin et al. | 707/102 |
| 6,094,676 A | 7/2000 | Gray et al. | 709/217 |
| RE36,840 E | 8/2000 | Mihalisin et al. | 345/140 |
| 6,128,599 A | 10/2000 | Walker et al. | 705/14 |
| 6,128,647 A | 10/2000 | Haury | 709/207 |
| 6,144,944 A | 11/2000 | Kurtzman, II et al. | 705/14 |
| 6,154,739 A | 11/2000 | Wrobel | 707/6 |
| 6,169,989 B1 | 1/2001 | Eichstaedt et al. | 707/100 |
| 6,175,829 B1 | 1/2001 | Li et al. | 707/3 |
| 6,182,050 B1 | 1/2001 | Ballard | 705/14 |
| 6,185,619 B1 * | 2/2001 | Joffe et al. | 709/229 |
| 6,189,008 B1 | 2/2001 | Easty et al. | 707/10 |
| 6,192,372 B1 | 2/2001 | Yamaura et al. | 707/104 |
| 6,195,654 B1 * | 2/2001 | Wachtel | 709/217 |
| 6,212,494 B1 | 4/2001 | Boguraev | 704/9 |
| 6,212,527 B1 | 4/2001 | Gustman | 707/102 |
| 6,233,575 B1 | 5/2001 | Agrawal et al. | 707/6 |
| 6,308,172 B1 | 10/2001 | Agrawal et al. | 707/5 |
| 6,311,211 B1 * | 10/2001 | Shaw et al. | 709/206 |
| 6,324,587 B1 * | 11/2001 | Trenbeath et al. | 709/206 |
| 6,415,289 B1 * | 7/2002 | Williams et al. | 709/219 |
| 6,480,881 B1 * | 11/2002 | Kubota et al. | 709/202 |

OTHER PUBLICATIONS

OTHER PUBLICATIONS

"Gnutella News—Gnutella News and Informtaion," Aug. 1, 2000, www.gnutella.com.

"Gnotella Help Page," Aug. 10, 2000, www.gnotella.nerd-herd.net/help.html.

SourceForge, "The Free Network Project Hom," Aug. 10, 2000, www.freenet.sourceforge.net/.

Bob Schmidt, "nguCache— Connecting the world," Aug. 10, 2000, www.gnucache.backroomwarehouse.com/.

Ian Clarke, et al. "A Distributed Decentralized Information Storage and Retrieval System", Division of Informatics, XP–002177459, 1999, pp. 1–43.

Brian Copperman, "Search and Destroy: iMesh Goes Hunting", XP–002177453, Nov. 19, 1999, p. 1–2.

"Technology Overview", Mojo Nation, XP–002177454, Feb. 14, 2000, p. 1–5.

"LimeWire is Free and Contains no SpyWare!", XP–002177455, Sep. 14, 2001, p. 1–3.

* cited by examiner

USE-SENSITIVE DISTRIBUTION OF DATA FILES BETWEEN USERS

BACKGROUND OF THE INVENTION

Many communities of Internet users share data files containing pictures, video and audio data with one another. In most communities, there are typically just a few users who provide these interesting data files and many more users who simply want to obtain them.

Users providing the files have typically done so either from altruism, from a desire to gain fame on the Internet in their particular network community, or from a desire to advertise a service and make money. Currently, various models for distribution of these types of files exist on the Internet.

One system for file distribution includes Usenet (Netnews), which allows a provider of a particular data file to post the data file to everyone that reads a particular newsgroup. This allows for widespread distribution of a posted data file. However, all data files posted go to all recipients, and each recipient may select only from the files that were recently posted. All users have to look over all items posted for items they are interested in, and posted files are removed from the system after a short time, typically within two or three days.

Another system for data file distribution includes a central website in which a data file owner makes his files available to all users on the network. While this allows recipients to select the files they wish to see, this approach has a number of drawbacks. First, the community of users must be informed of the existence of the website. Secondly, each website is structured differently, depending on the provider of the data, making it difficult for requesting users to locate data they want. Third, and perhaps most importantly, since there are only a few website providers and many data file requesters, the few providers are deluged with requests which overwhelms the provider's website. Regardless of the number of users that download a given file, the relative availability of that file is solely based on the single copy at the website. The more popular a file is, the less likely a given user will be able to obtain it because of the traffic generated by all the other users attempting to download it. This is true especially in regard to large data files such as video or audio data files.

An improvement on the central website model for distributing files involves data file mirroring. In a data file mirroring system, a central server contains a master copy of files to be shared, and each mirror server connects to the central server and downloads all of the files to be mirrored. While this type of system spreads the load amongst all the mirror servers, it is inherently centralized, contains an identical set consisting of both popular and unpopular files and is not sensitive to use. For instance, a file that 10,000 users have downloaded is just as widely available as a file that only 10 users have downloaded. Since mirroring is centrally administered and by definition is a complete copy of a central repository, it is not use-sensitive.

Yet another system for file distribution involves a chat room where users of the chat room can exchange data that they are interested in trading in real time. This allows individuals to exchange data and does not require expensive, high-bandwidth central servers. However, because there are many requesters and few providers, the few providers may become deluged with requests. What is more, they must handle the requests individually and manually.

As a result of the problems listed above, few users in these communities wish to go through the effort and expense required in the previously discussed distribution models. Thus, the widespread availability of data files quickly turns into a one-for-one exchange between specific parties.

Thus, it can be seen that there is a long-standing need on the Internet for a system that facilitates the distribution of data files in a community of users.

The distribution system must provide users a way to quickly and reliably locate data they wish to acquire.

The distribution system must provide wide distribution for files that are popular, while at the same time provide limited distribution for files that are not of general interest.

Importantly, the mechanism for actually transferring the data file between users must be distributed, not centralized, so that bandwidth costs of providing data are fairly and properly distributed across the users of the community. Therefore, any user can contribute new data files without relying on some central authority.

SUMMARY OF THE INVENTION

The invention contained herein describes a use-sensitive system for distribution of data files between users in a networked community of users. The system comprises each user having a distribution application having at least one data file repository that has the ability to store at least one data file. The distribution application additionally includes a data file transfer server that makes available all data files located in the data file repository for download by other users, a file transfer client, and a user interface for displaying the actions and status of the distribution application to the user. In the system, the file transfer client connects to the file transfer server and downloads a data file, and, when the downloaded file is placed in the repository, the distribution application automatically makes available the data file to other distribution applications in the networked community of users.

The system preferably has a file index server containing a file index, the file index further having file descriptions of any data file in the at least one file repository of each distribution application. In an embodiment, the system further comprises an inventory module for automatically adding a file description to the file index when a new data file is added to the repository of any distribution application. The inventory module preferably automatically removes the file description in the file index when the file is removed from the repository of any distribution application. The inventory module also preferably automatically removes all file descriptions from the file index associated with any distribution application when that distribution application is disconnected from the file index server.

In an embodiment of the invention, the system also includes an audio file player module, wherein audio files located in the data file repository are audibly presented to the user.

In yet another embodiment, the distribution application has an audio file converter module, which constructs audio files and places them in the data file repository, thus making the new files immediately available to the community of users.

In an embodiment, the system further comprises a video file player module, wherein video files located in the data file repository are displayed visually to the user.

The system preferably has means for downloading a data file from a protected distribution application, wherein the requesting distribution application transmits a download request message to the index server, the index server forwards the download request message to the protected distribution application, the protected distribution application initiates a connection to the requesting distribution application, and then transmits the file to the requesting distribution application.

The file description comprises any of the following: a title of the data file, the size of the data file, the type of data file, any text associated with the data file, the creator of the data file, the quality rating of the data file, and the distribution application where the data file resides.

In a preferred embodiment, the system further comprises a search module for searching the file index, wherein a search request submitted by the distribution application is processed and results in a search response returned to that distribution application, wherein the search response comprises file descriptions matching the search request. Preferably, the search module further comprises a filter module for pruning a search response of file descriptions that do not meet a limitation criteria. In an embodiment, the limitation criteria comprises a bandwidth limitation, wherein the search response is pruned of file descriptions from distribution applications that have a bandwidth capability that is below the bandwidth limitation. In an embodiment, the search module comprises means for pruning the search response of file descriptions from distribution applications that will not accept further download requests. In a preferred embodiment, the search module comprises means for pruning the search response of file descriptions from the distribution application.

In an embodiment, the distribution application contains a sort module for sorting the search response. Preferably, the search response is sorted using a responsiveness value, wherein the responsiveness value for another distribution application is determined by measuring the amount of time an echo reply message takes to be returned by the other distribution application to the user's distribution application. In an embodiment, the search response is pruned of file descriptions from any distribution application that did not respond to the echo request within a predetermined period of time.

The data files are of the type selected from the group comprising: an audio data file, a text data file, an image data file, a video data file, a software executable data file, or a data file containing combinations, such as a multimedia data file.

In another embodiment, the invention further comprises an automatic selection module, wherein a data file description is automatically selected and the associated data file is downloaded, the automatic selection module choosing a data file description from at least two candidate data file descriptions located on at least two file transfer servers using a scoring mechanism and then causing the file transfer client to initiate a download from the file transfer server with the best score. Preferably, the optimal score in a scoring mechanism is calculated from any combination of the following factors: the file transfer server with a low round-trip response time, the file transfer server with a high network bandwidth, the file transfer server with a high percentage of successful downloads, and the file transfer server with the fewest active file transfers.

In yet another embodiment, the system further comprises a parallel download module, wherein different subsections of an identical data file are downloaded from at least two other distribution applications. Preferably, the at least two other distribution applications are automatically selected using a scoring mechanism.

The invention is a system of distribution applications that all incorporate both a file transfer client and a file transfer server. Each distribution application contains a repository of files to be provided to others on the network. In the preferred embodiment, any files downloaded to a distribution application are automatically added to that distribution application's repository of files, making newly downloaded files available for re-export.

Joining the file transfer client and the file transfer server means that all users will act as suppliers of interesting data files to the community, including especially those users that are initially only interested in obtaining data files. As users are more successful at obtaining more files, they can in turn become providers of the files that they obtain to the rest of the community.

The system of distribution applications is use-sensitive, because the community of users that interact using these distribution applications determines the particular files that flow through and exist on the network. Popular files that are downloaded frequently will exist in a large number of repositories. If a given file has had 10,000 users download it, there are 10,000 places where other users can find this file, making it extremely unlikely that any one site will be overloaded with requests. Likewise, unpopular files will only exist in a couple of places, unlike a mirrored system that must store a copy of each file held by the central repository. However, if an unpopular file suddenly becomes popular, the system as a whole reacts rapidly to the change in usage to provide increased availability for the file as demand increases, because each new user that successfully downloads the file becomes in turn a provider for the file.

Preferably, the invention also includes an index server containing the list of all the files on all the distribution applications. In this way, a user can obtain from the index server a high quality distribution application from which to download a desired file. All distribution applications contribute a description of all files in their repositories to the index server when they first start up, and when a distribution application is disconnected, all of the descriptions associated with that distribution application are removed from the index server automatically, keeping the index server up to date.

DETAILED DESCRIPTION OF THE PRESENT INVENTION

Figure 1:
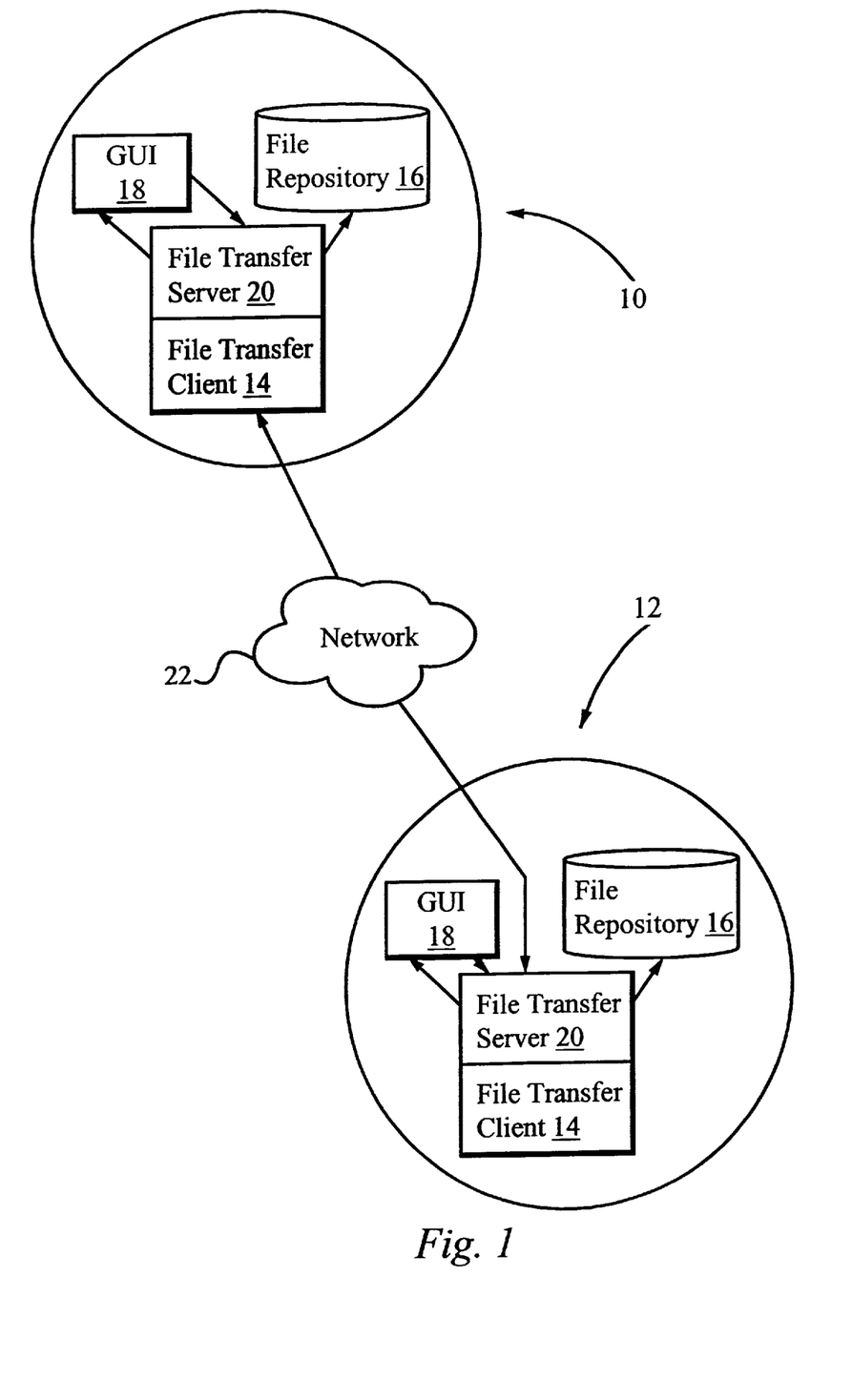
FIG. 1 shows two distribution applications communicating over a network in accordance with the present invention.
Figure 3:
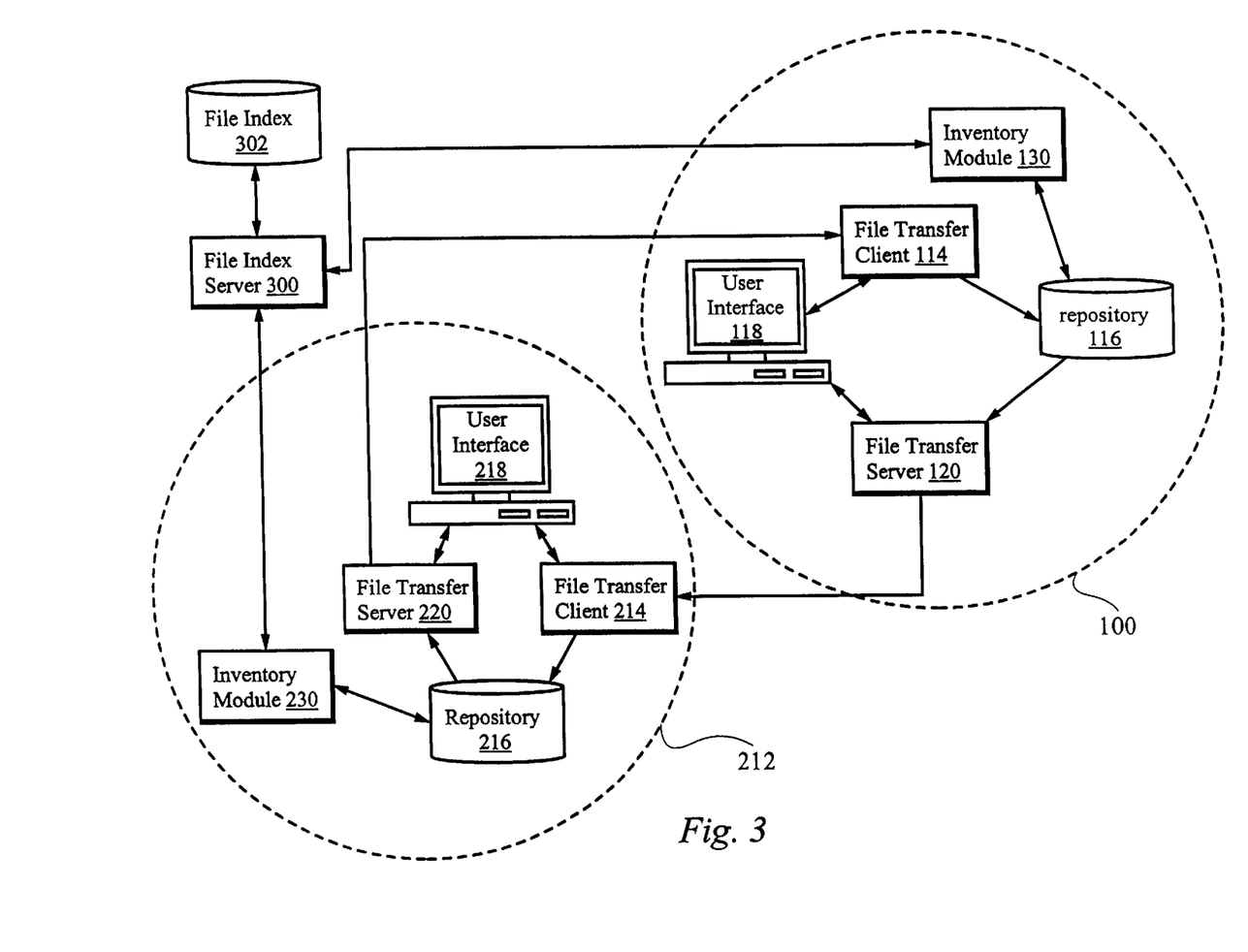
FIG. 3 shows the system having a file index server to maintain file descriptions of files that are available for distribution in accordance with the present invention.

The system in accordance with the present invention as shown in FIG. 1, comprises distribution applications 10 and 12 in which each distribution application 10, 12 includes a file repository 16, a file transfer client 14, a file transfer server 20 and a graphical user interface 18. The system of the present invention preferably has a file index server (FIG. 3) which contains a list of files descriptions that are located within all the distribution applications 10, 12 in the system. In addition, the system can also have a search module (FIGS. 6 and 7) for searching the file descriptions contained within the file index server (FIG. 3). FIG. 1 also shows a network 22 interconnected between the distribution applications 10, 12.

Figure 2:
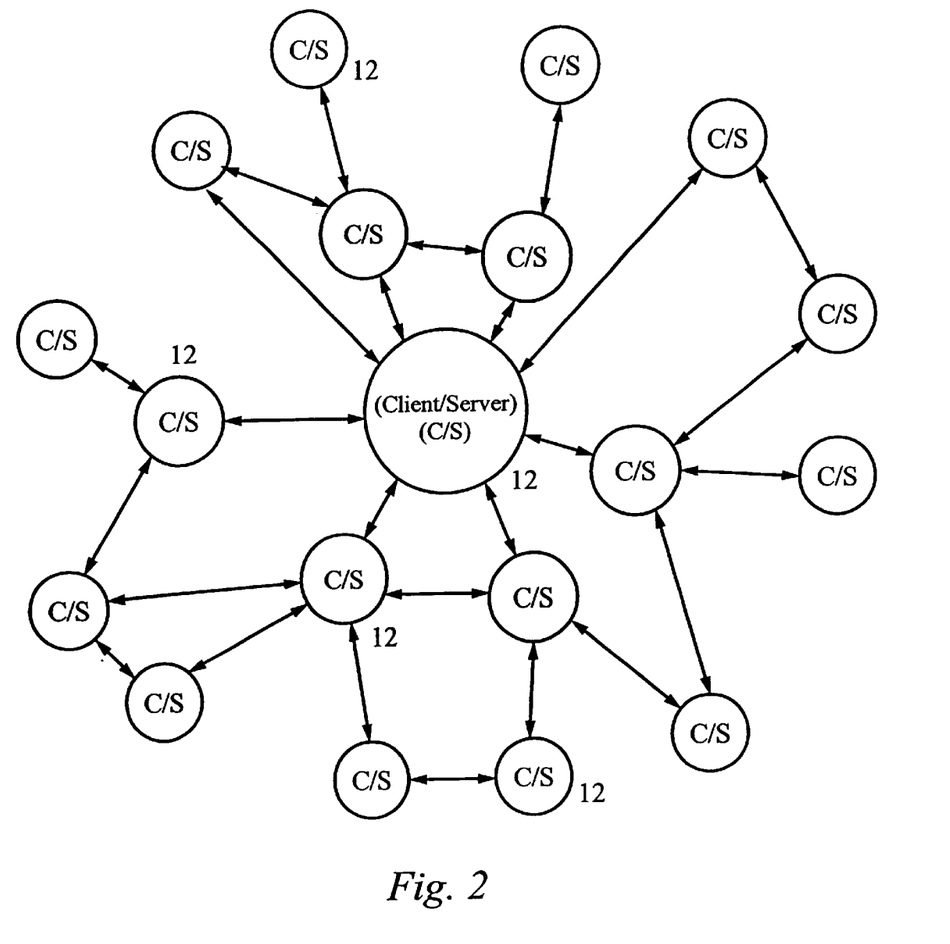
FIG. 2 shows a general diagram of a use sensitive system with a number of distribution applications that distribute requested files between users in accordance with the present invention.

As can be seen in FIG. 1, all distribution applications 10, 12 have the same functionality. One user's file transfer client 14 can download files from another user's file transfer server 20, and vice versa. It should be understood in this description that although only two distribution applications 10, 12 communicating with each other are explicitly discussed, any number of distribution applications may be utilized in the system of the present invention. This is shown in FIG. 2 wherein a plurality of client servers, each denoted as C/S 12, are connected to one another in a system. As shown in FIG. 2, once a C/S 12 downloads a file from another C/S 12, it is able to distribute the file downloaded to other C/S 12 applications in the system. The particular components within system of the present invention will now be discussed.

Data File Repository

FIG. 3 illustrates the system of the present invention having a first distribution application 100 and a second distribution application 212, a file index server 300, and a file index 302. Each distribution application 100, 212 preferably includes: a file transfer client 114, 214; a data file repository 116, 216; a graphical user interface 118, 218; a file transfer server 120, 220 and an inventory module 130, 230. Preferably, the data file repository, or repository, 116 shown in FIG. 3 is where the all of the data files to be shared are stored. In the preferred embodiment, the data file repository 116 contains at least one directory on disk drives in a personal computer.

In an alternative embodiment, the data file repository 116 may be a database. In another embodiment, the repository 116 may be a network accessible disk drive that the distribution application 100 can access. Alternatively, the repository 116 can also be a collection of directories enabling the user to organize files by type, classification, or attribute.

Files obtained from one distribution application 212 to another distribution application 100 are initially stored in the data file repository 116 immediately after being downloaded, making these newly downloaded data files available to other distribution applications (not shown).

Inventory Module

A description of each file placed in the file repository 116 is automatically made available by an inventory module 130 in the distribution application 100 to other distribution applications 212 in the community. In the preferred embodiment, the inventory module 130 verifies that each file is a valid file of the types of files available for distribution. The inventory module 130 also extracts a title of the data file, the size of the data file, the type of data file, any text associated with the data file, the creator of the data file and the quality rating of the data file. The inventory module 130 is responsible for detecting the addition of a new file and making a description of the new file available to other distribution applications 212.

When a user does not wish to make a downloaded data file available for distribution, he may move the data file out of the file repository 116. The inventory module 130 detects the removal of a file from the repository 116 and removes the associated file description. Alternatively, the user is queried each time a file is downloaded, such as through a dialog box, whether or not the particular file is to be made available for distribution to other distribution applications 212.

In an alternative embodiment, the user can specify that all downloaded data files are not to be placed in the repository 116. In this case, newly downloaded data files will not automatically be shared with other distribution applications 212. Thus, the inventory module 130 detects modifications to the repository 116 in a manner that depends on the environment on which the distribution application 100 is executing.

The inventory module 130 can use operating system resources to automatically monitor the directory that contains the files in the repository 116. The inventory module 130 can also receive file add/file remove events from the operating system as files are added and removed.

In an alternative embodiment, the inventory module 130 must access the directory or directories within the repository periodically in order to detect modifications to the repository. In this embodiment, the inventory module 130 periodically examines each directory comprising the repository 116. When the last modification time shows that the directory has been modified recently, the inventory module 130 checks the contents of the directory to ascertain which files if any have been added or removed.

Where the repository 116 is a database, the inventory module 130 uses database triggers to automatically monitor the repository 116 as well as receive file add and file remove events from the database as files are added and removed.

Other implementations of the inventory module 130 for detecting addition and removal of files from a repository 116 are possible, but fall within the definition of either employing the operating system to notify of file additions and removals, or periodically checking the repository 116 to detect file additions and removals.

In an alternative embodiment, the inventory module 130 connects to a file index server or index server 300 using TCP/IP specified by RFC 798, herein included by reference. This index server 300, shown in FIG. 3, contains a file index 302, in which the file index 302 contains file descriptions of the data files in the repository 116, 216 of each distribution application 110, 212. When the connection to the index server 300 is initially made, as will be discussed below, the inventory module 130 of the distribution application 100 transmits the description of each file in its repository 116 to the index server 300. The index server 300 then adds each data file description reported by each inventory module 130, 230 to the master list of file descriptions in the file index 302.

As the inventory module 130 detects file addition or file removal events in its repository 116, the inventory module 130 transmits these events to the index server 300. The index server 300 in turn creates or removes the file descriptions from the master list of file descriptions in the file index 300 as appropriate.

Upon disconnection of the inventory module 130 from the index server 300, the index server 300 removes all file descriptions that were previously transmitted to the index server 300 from the inventory module 130. Thus, the index server 300 is kept up-to-date as to the particular files that are accessible by distribution applications 100, 212 in the community. Although a TCP/IP connection can be terminated for a variety of reasons, a disconnection is an indication that the distribution application 100 is unavailable to other distribution application 212 in the community. For example, a disconnection can occur when a distribution application 100 or a network connection is terminated.

Periodic messages can be sent by the index server 300 using the TCP/IP connection to ensure that the inventory module 130 is still operating. The frequency of these messages is once per minute, transmitted from the inventory module 116 to the index server 300. If an index server 300 does not receive a message within two minutes from a particular inventory module 130, the index server 300 will treat the nonreceipt of the message as a standard disconnection and terminate the TCP/IP connection to that module 130. This is necessary to detect situations where the machine in which the inventory module 130 is executing crashes, or the network path to the inventory module 130 goes down.

File Transfer Client

Each distribution application 100, 212 has a file transfer client 114, 214. The file transfer client 114 allows the user of a distribution application 100 to download files that are located in the repositories 216 of other distribution applications 212. To initiate a transfer, the file transfer client 114 makes a connection to a file transfer server 220 using a stream-oriented connection protocol, such as TCP/IP.

Once a connection is made, the file transfer client 114 of the first distribution application 100 transmits a download request to the file transfer server 220 of the second distribution application 212. The file transfer server 220 of the second distribution application determines if the requested file exists, and if it does, transmits the file to the file transfer client 114 of the first distribution application. The progress of the transmission is made available to each user interface in both distribution applications 100, 212 as sections of the file are received by the file transfer client 114. If the connection to the file transfer server 220 of the second distrubiotn application 212 is disconnected, both distribution applications' 100, 212 user interfaces reflect the change in connection status.

In the case of a disconnection during transmission of a data file, in which the data file is partially transmitted, the transfer may be re-initiated by the downloading distribution application 100 using a retransmit request. In this case, the transfer resumes from the last data block received by the file transfer client 114 from the file transfer server 220 of the second distribution application 212. Therefore, a retransmit request is distinct from the standard download request, because the retransmit request allows the file transfer client 114 to make use of the partial file previously downloaded from the file transfer server 220 of the second distribution application 212.

Alternatively, in the case where the initial file transfer server 220 is no longer available after disconnection, a retransmit request from the file transfer client 114 is sent to a different file transfer server (not shown) that contains the identical file.

The specific messages sent between two applications engaged in performing some activity on a network is known as a protocol. To communicate with and download files from the file transfer server 220 of the second distribution the file transfer client 114 uses the FTP protocol specified in RFC 959 by Postel & Reynolds, or another similar file transfer protocol. It should be noted that basic file transfer protocols are well known in the art.

Figure 8:
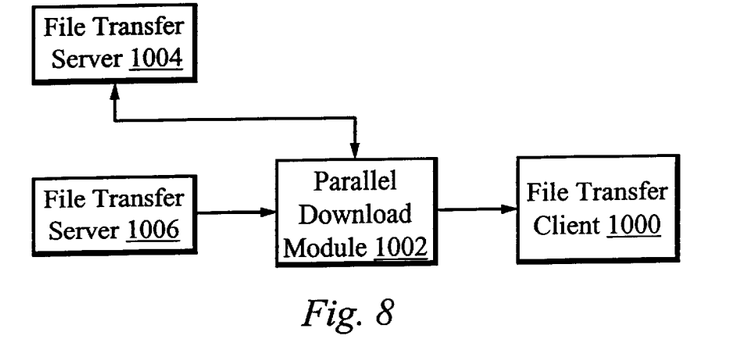
FIG. 8 shows a block diagram of the system having a parallel download module in accordance with the present invention.

Alternatively, as shown in FIG. 8, a parallel download module 1002 may be used to improve transfer rates of slow file transfer servers 1004, 1006. The parallel module 1002 would be connected to at least two file transfer servers 1004, 1006 in order to download a given data file. The file to be downloaded from each file transfer server 1004, 1006 must be identical. The parallel download module 1002 requests a different section of the given data file from each of the file transfer servers 1004, 1006 by using a file subsection download request. Thereafter, a completed download is reported when all sections have been successfully downloaded. This allows a high-bandwidth file transfer client 1000 to rapidly download parts of the same file from several lower bandwidth file transfer servers 1004, 1006.

Figure 5:
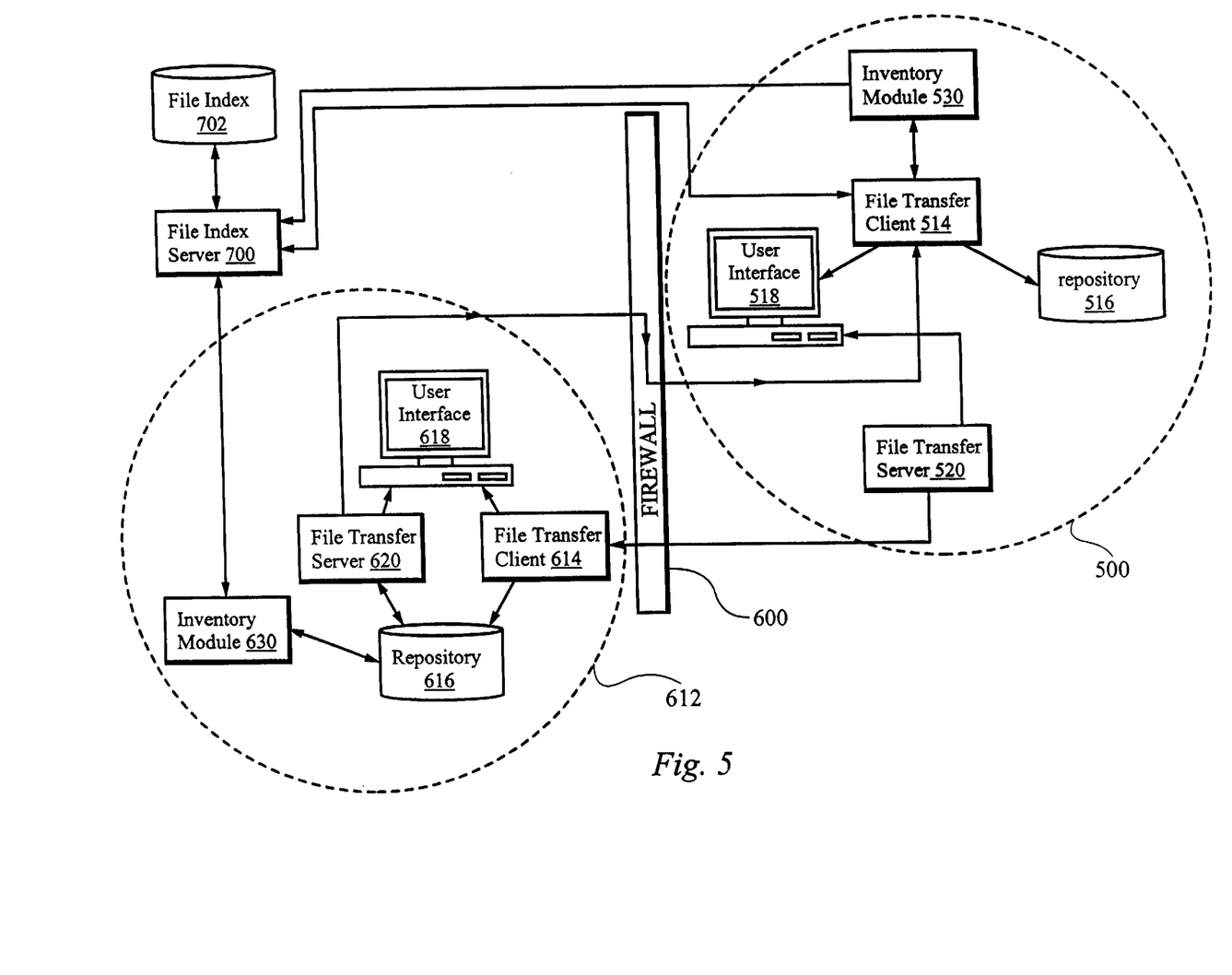
FIG. 5 shows the invention that uses a file index server to maintain file descriptions of files that are available for distribution in which the file transfer server is protected by a firewall in accordance with the present invention.

In an alternative embodiment, the file transfer client 514 transmits a reverse download request to a protected file transfer server 620, which is located behind a firewall 600 and is unable to receive incoming connections directly from file transfer client 514. In this embodiment, the file transfer client 514 transmits the reverse download request to the index server 700 and commands the index server 700 to forward the reverse download request to the protected file transfer server 620 using the connection between the index server 700 and the inventory module 630 of the protected file transfer server 620. When the protected file transfer server 620 receives a reverse download request, the transfer server 620 initiates a connection to the requesting file transfer client 514, after which the file download process occurs normally. This allows a file transfer client 514 to obtain a connection to a protected file transfer server 620.

File Transfer Server

The file transfer server 220 shown in FIG. 3 allows the user of the distribution application 212 to provide files that are located in its data file repository 216 to other distribution applications 100. For instance, the file transfer server 220 of the second distribution application 212 handles incoming transmission requests from the file transfer client 114 of the first distribution application 100.

The file transfer client 114 may request a file from the file transfer server 220. Upon receiving the request for a given file from the file transfer client 114, the file transfer server 220 examines its data file repository 216 to determine if the file is available for downloading. If the file is available, the file transfer server 220 transmits that file to the file transfer client 114.

In the preferred embodiment, when a file transfer server 220 begins executing the request from the file transfer client 114, the transfer server 220 makes an initial determination if the server 220 is protected by a firewall, or if it is otherwise unable to receive communication from the file transfer client 114. If so, the server 220 indicates this to the inventory module 230. The inventory module 230 then notifies the index server 300 of the server's 220 protected status. If this status is set or unchangeable, the file transfer client 114 must use a reverse download request as discussed above.

Each file transfer client that wishes to communicate with a file transfer server has its own TCP/IP connection to the file transfer server. In an alternative embodiment, the specific protocol used by the file transfer server is a subset of the protocol embodied in the FTP protocol specification (RFC 959). As a file transfer client 114 connects to the second distribution application 212 and requests a file to download, the file transfer server 220 of the second distribution application 212 notifies the user of the status of each download using the user interface module 118 of the first distribution application. In the preferred embodiment, the second distribution application 212 limits the maximum number of concurrent download requests being processed by its file transfer server 220. In addition, the first distribution application 100 also specifies the maximum number of other file transfer clients 214 that may connect to the first distribution application's 100 file transfer server 120. These limitations, including the current number of connections that are present and the number of downloads currently being executed, are transmitted to the file index server 220. When a new file transfer client (not shown) connects to the file transfer server 220, the limitations are checked and connections in excess of this number are refused or queued.

In an alternative embodiment, the file transfer server 220 handles a file subsection download request by downloading only that subsection of a given file, instead of providing the entire file. This allows a high-bandwidth file transfer client 114 to download, in parallel, different parts of a given file from several lower bandwidth file transfer servers (not shown).

In another alternative embodiment, the file transfer server 620 in Figure—handles a reverse download request from a file transfer client 514 when the server 620 is protected by a firewall. As discussed above, the reverse download request is issued by the transfer client 514, transmitted to the index server 700, and forwarded down the second distribution application's 612 inventory module 630 TCP/IP connection. The request is then given to the file transfer server 620 of the second distribution application 612. Upon receiving a reverse download request, the file transfer server 620 actively connects to the file transfer client 514, and initiates the transfer of the particular file to the file transfer client 514. This "active connection" from file transfer server 620 to file transfer client 514 is the reverse of what normally occurs during a file download session.

Index Server

In the preferred embodiment, the system of the present invention, as shown in FIG. 3, includes an index server 300, which provides a master list containing data file descriptions of all data files that exist in the repositories 116, 216 of the distribution applications 100, 212 which are available for download. The index server 300 executes on a computer system that is remote from the distribution applications 100, 212. The index server 300 contains no data files itself; rather, it contains a list of data file descriptions located in repositories 116, 216 of currently executing distribution applications 100, 212 in the community.

Each distribution application 100, 212 has an inventory module 130, 230 (previously described) that maintains a connection to the index server 300. When the first distribution application 100 requests a particular data file from the second distribution application 212, the inventory module 230 of the second distribution application 212 initially connects to the index server 300 and uploads descriptions for each data file contained in its repository 216, as well as information regarding the configuration of its file transfer server 220.

As files are added and removed from the repository 116, 216 of the distribution application 100, 216, the file transfer server 120, 220 for each distribution application 100, 216 transmits a new description for each file added and transmits a "delete" message for each file removed to the index server 300. If the connection between the index server 300 and the file transfer server 120, 220 is broken, then the index server 300 automatically removes the data file descriptions that the disconnected file transfer server 120, 220 had previously transmitted to the index server 300.

The index server 300 optionally stores particular information for each distribution application's file transfer server in the system. Such information includes: IP addresses; lists of file descriptions; the number of current connections each file transfer server is handling; the number of current downloads each file transfer server is handling; the limit number of connections configured for each file transfer server; the limit number of downloads configured for each file transfer server; bandwidth to network configurations; which file transfer servers in the system are protected by firewall; and the percentage of successful downloads the system has handled.

The connection and download limits are placed by the user on his distribution application's 100 file transfer server, which limit the number of concurrent connections and downloads that the file transfer server 120 will allow. The network bandwidth configuration is preferably set by the user, while in an alternative embodiment the network bandwidth configuration is determined experimentally by the user's file transfer server module 120. This information is transmitted by the file transfer server 120 through the inventory module 130 to the index server 300. The percentage of successful downloads, also known as the server reliability, is calculated by the index server 300. The index server 300 calculates the percentage by observing all transfers that occur from each file transfer server 120, 200 in the system and notes the number of transfers that succeed and fail. From these observations, the index server 300 calculates the percentage of successful downloads for each file transfer server 120, 200 in the system.

The index server also optionally stores information for each file description such as: filename; file data type (text, audio, images, video, etc); file size; ancillary description (data type dependent). The file data type can be text, audio, images, or video. Other data types can be added without departing from the spirit of the invention. The file size is the number of bytes in the data file. For audio files, the ancillary description comprises the sampling rate, the bitrate, the creator of the file, and the original source from where the audio file was obtained. For text files, the ancillary description comprises the author, a synopsis, the original publication date, and the ISBN. For video files, the ancillary description comprises the picture size, the running time, the bitrate, the number of frames per second, the synopsis, and the title of the video.

Figure 6:
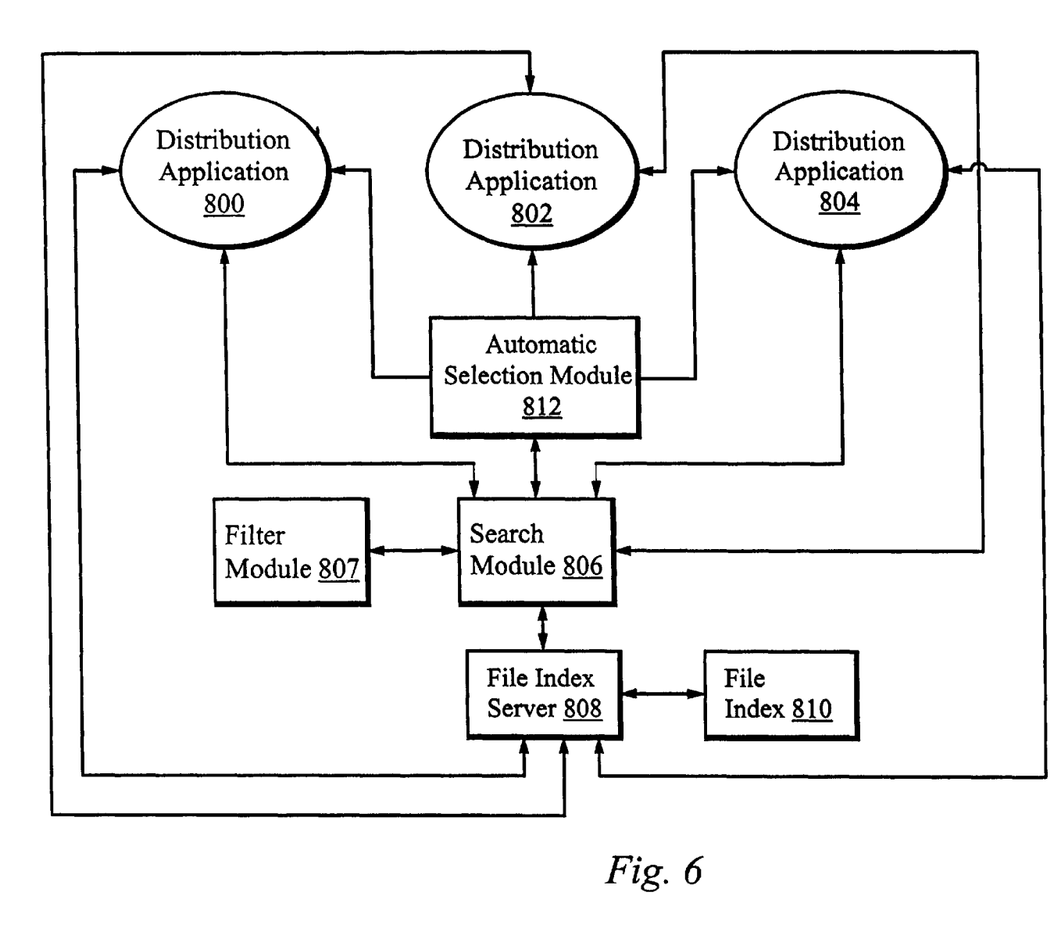
FIG. 6 shows an alternative embodiment of the system having a search module, automatic search module and a filter module in accordance with the present invention.

FIG. 6 shows the preferred embodiment, where the system of the present invention utilizes a search module 806 for searching the file index, in which a search request submitted by the distribution application 800 is processed and a search response, containing file descriptions matching the search request, is returned to that distribution application 800. When a user wishes to locate a particular data file, the search module 800 constructs a search request to the file index 810 based on the search criteria specified by the user through the distribution application 800. The search criteria can contain a complete filename or a subsection of the filename, limitations on any of the fields of ancillary data, the file size, or limitations on the file transfer server including bandwidth to network or percentage of successful downloads. The index server 808 executes the search request, prunes the file descriptions as appropriate, and displays the search response to the user.

Preferably, the search module includes a filter module 807 for pruning the search response for file descriptions that do not meet a limitation criteria. The limitation criteria comprises a bandwidth limitation, in which the search response is pruned of file descriptions from distribution applications 802, 804 that have a bandwidth capability that is below the bandwidth limitation.

In an alternative embodiment, the search module 806 automatically redirects traffic away from busy file transfer servers of other distribution applications 802, 804 by sorting the file descriptions in the search results by the number of currently available downloads remaining for each of the file transfer servers. The number of currently available downloads remaining for a file transfer server is calculated by subtracting the number of current downloads from the download limit.

In an alternative embodiment, the search module 806 is comprised of several fault tolerant computer systems that act together to efficiently and rapidly process search requests and file description updates for a large number of users.

Figure 7:
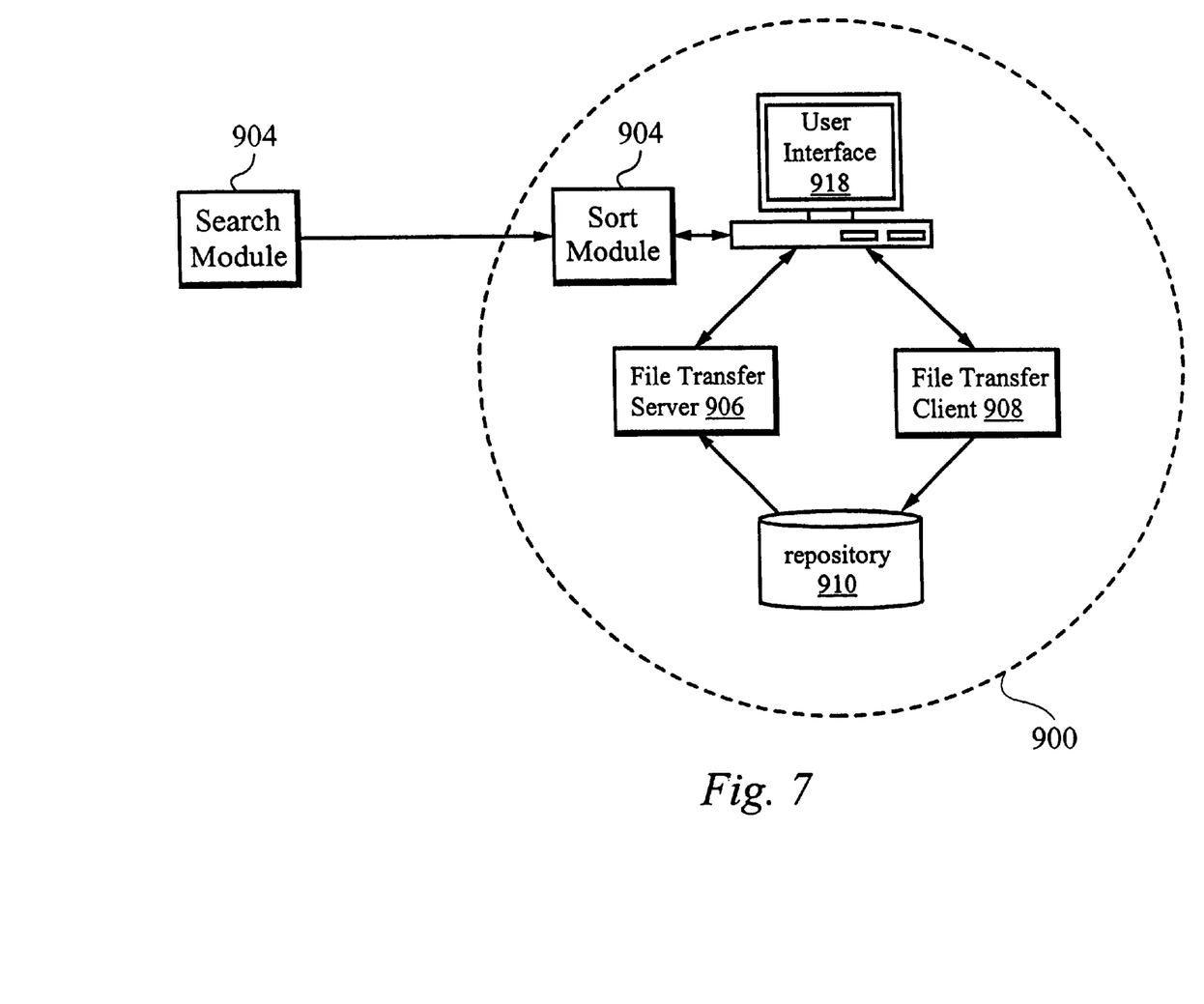
FIG. 7 shows an alternative embodiment of a distribution application with a sort module included in accordance with the present invention.

In an alternative embodiment shown in FIG. 7, the distribution application 900 contains a sort module 904 for sorting the search response received from the search module 904. Preferably, the search response is sorted using a responsiveness value, wherein the responsiveness value for another distribution application (not shown) is determined by measuring the amount of time an echo reply message takes to be returned by the other distribution application to the user's distribution application. In an embodiment, the search response is pruned of file descriptions from any distribution application that did not respond to the echo request within a predetermined period of time.

Graphical User Interface

The user interface 118 allows the user to configure the behavior of the file transfer client 114 and file transfer server 120, in addition to displaying the current status of all the components of the distribution application 100. The user can configure the maximum number of concurrent connections as well as the maximum number of concurrent downloads that the file transfer server 120 will allow.

The user interface 118 displays the status of each file transfer as it occurs, along with the estimated time until completion, the filename, the percentage of the file transferred, and an identification string for each distribution application 212 currently connected to the user's file transfer server 120. This information is displayed for both the file transfer server 220 (listing other file transfer clients 214 downloading files from the user's file transfer server 120) and the file transfer client 114 (listing the user's file transfer client's 120. downloads of files from other file transfer servers 220).

The user interface 118 provides a form for the user to construct a search request for a particular file type, based on the name of the file to be downloaded, ancillary data appropriate for that file type, and limitations on the file transfer server's bandwidth or percentage of successful downloads. The user interface 118 then transmits the search request to the index server 300, and receives a search response containing a list of file descriptions that matched the search request.

In an alternative embodiment, the user interface 118 transmits an Internet Control Message Protocol (ICMP) echo request to each file transfer server 220 that contains one or more of the returned file descriptions and measures the amount of time it takes for each file transfer server 220 to respond with an ICMP echo reply. The amount of time measured for the transfer server 220 to respond yields a file transfer server responsiveness value. If a file transfer server 220 does not respond within a specified period of time, it is marked as not responding, and the file descriptions associated with that file transfer server 220 are pruned from the search response list in the file index server 300.

Given a search response, the user can choose to sort the response by filename, server responsiveness, network bandwidth of the file transfer server, or by any one of the ancillary data fields appropriate to that particular data type.

Using the displayed sorted search response, the user can select one of the data file descriptions, thus initiating a download of the data file using the file transfer client 114. The user interface 118 shows the status of each download. Any download can be canceled prior to completion. Interrupted downloads are displayed as well.

Figure 4:
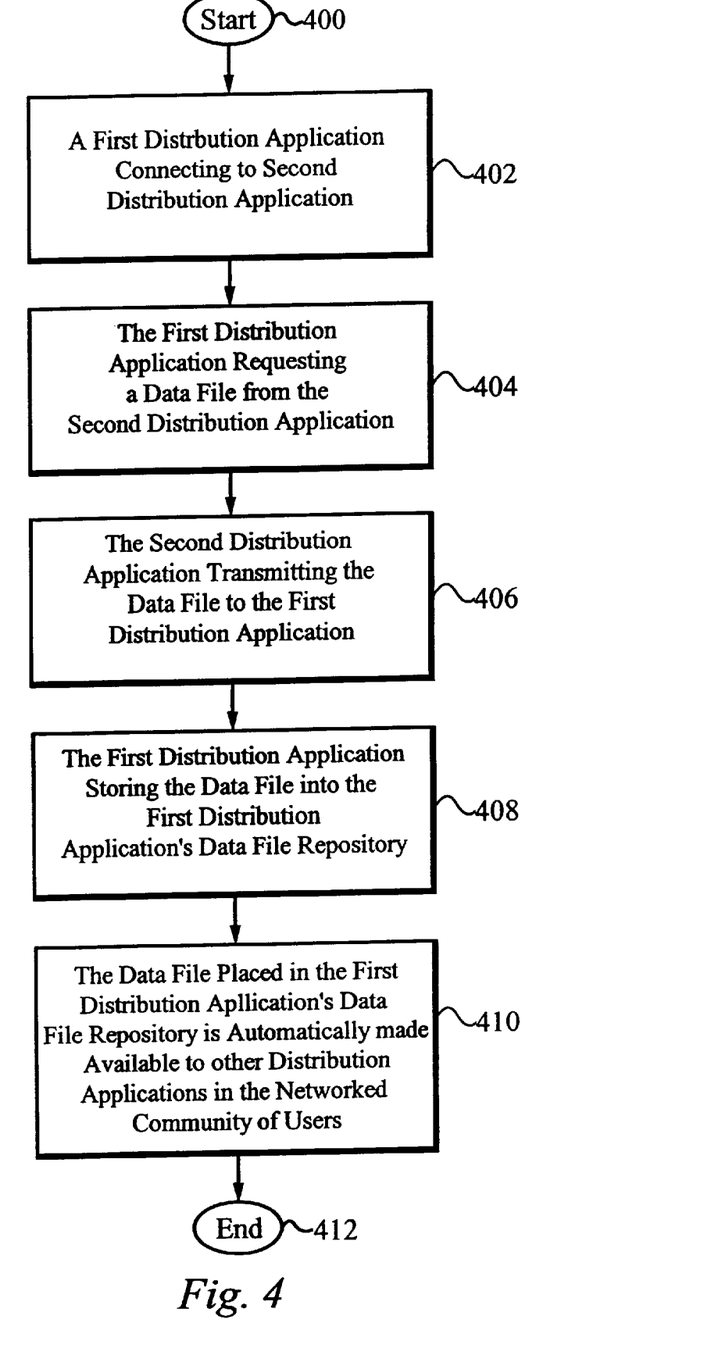
FIG. 4 illustrates a flow chart of the preferred embodiment of the method of the invention in accordance with the present invention.

In the preferred operation, the system of the present invention distributes data files as shown in FIG. 4. After a distribution application is connected to the system, the process begins 400. The first step 402 is that a first distribution application connects to a second distribution application. Following, the next step 404 is that the first distribution application requests a data file from the second distribution application. In step 406, the second distribution application transmits the data file to the first distribution application. Next, in step 408, the first distribution application stores the data file into the data file repository. Then, as shown in step 410, the data file is placed in the first distribution data file repository and is automatically made available to other distribution application in the community.

Other Modules

FIG. 6 illustrates an alternative embodiment of the present invention including an automatic selection module 812 utilizes the search response from the search module 806 to allow the distribution application 800 to automatically select the best file transfer server in distribution applications 802 and 804 that contains the data file to be downloaded and initiate a downloads without requiring the user to select which particular distribution application's 802, 804 file transfer server is to be accessed for the download. The automatic selection module 812 determines the best file transfer server based on a scoring of each file description and the associated file transfer server description returned in the search response. The scoring calculation performed by the automatic selection module 812 eliminates data file descriptions for files on file transfer servers that will not allow any more downloads. The automatic selection module 812 also weighs the successful download percentage, the network bandwidth and the echo response time and applies this calculation to each file description to achieve a score for each file transfer server. The automatic selection module 812 then informs the distribution application 800 of the file transfer server having the optimal score. The file transfer client (not shown) is then instructed to perform the download from the file transfer server having the best score.

In an alternative embodiment, a parallel download module 1002, as shown in FIG. 8, facilitates the rapid download of files by simultaneously downloading different sections of the same file from at least two file transfer servers 1004, 1006. The parallel download module 1002 selects the best of at least two file transfer servers 1104, 1006 from among all the file transfer servers associated with the file descriptions in the search response. Then, the user's file transfer client 1000 is instructed to download different sections of the same file from each of the file transfer servers 1004, 1006. This allows a user's distribution application with a high bandwidth connection to utilize several lower-bandwidth servers to maximize the transfer rate. It also distributes the file transfer load across several different file transfer servers 1004, 1006. Note that for this to function properly, both file transfer servers 1004, 100 must have the identical file. In one embodiment, file identicality is assumed if the file descriptions (including the file size) are the same. Other methods of detecting file identicality may be used here, and such methods are well known in the art.

Figure 9:
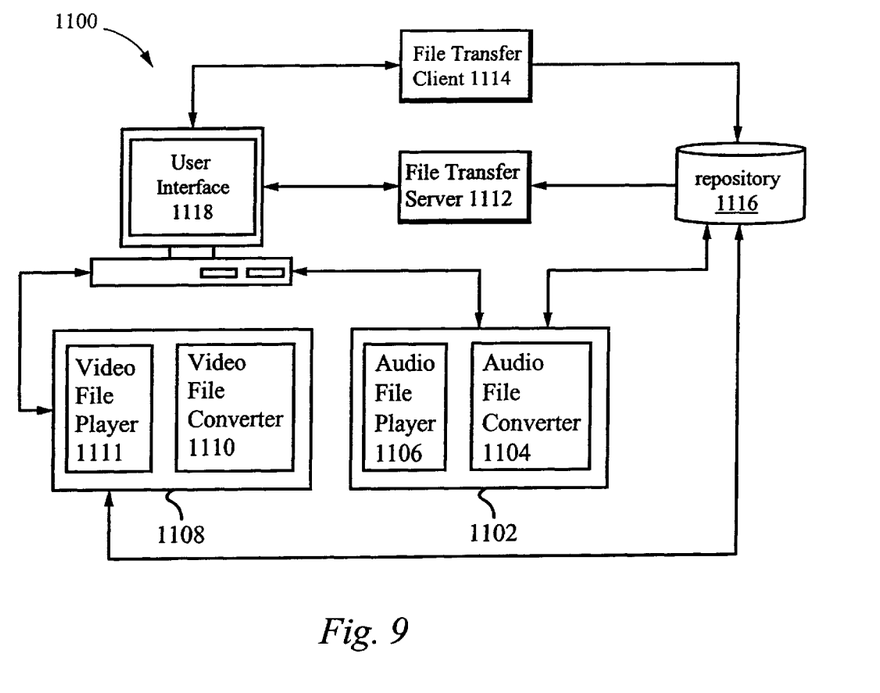
FIG. 9 shows an alternative embodiment of the system having an audio and video file module in accordance with the present invention.

In an alternative embodiment shown in FIG. 9, the distribution application 1100 contains an audio file module 1102, which includes an audio file player 1106, as well as an audio file converter 1104. The audio file player 1106 plays files located in the data file repository 1116, while the audio file converter 1104 generates audio files either by sampling data from a microphone or tape, or by converting data stored on a CD-ROM or hard disk into a standard compressed audio file format. Converted audio files are placed in the repository 1116, allowing other users in the community to access these new audio files.

In addition, the distribution application 1100 may also contain a video file module 1108, which includes a video file player 1111, as well as a video file converter 1110. Much as in the audio example above, video images (either still, or full motion) are converted from external sources to compressed standard formats and are placed in the repository 1116. Likewise, video files in the repository 1116 are displayed to the user by the video file player 1111.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A system for distributing a data file between a plurality of distribution applications in the system, the system comprising:
  a. a plurality of distribution applications, wherein a first distribution application within the system includes the data file;
  b. a second distribution application coupled with the first distribution application, such that after the data file is transferred from the first distribution application to the second distribution application, the second distribution application automatically makes available the data file to other distribution applications in the system;
  c. a file index coupled to each distribution applications in the system, wherein the file index contains a file description of every data file in the system; and
  d. a search module coupled to the second distribution application, the search module for searching the file index for a user requested search item and providing a search response of file descriptions matching the user requested search item.

2. The system according to claim 1 wherein the first distribution application further comprises a first file repository for storing the data file.

3. The system according to claim 1 wherein the first distribution application further comprises a first file transfer client coupled to the first file repository, the first file transfer client for receiving a second data file from any of the plurality of distribution applications in the system.

4. The system according to claim 1 wherein the first distribution application further comprises a first file transfer server coupled to the first file repository, the first file transfer server for transferring the data file to the second distribution application.

5. The system according to claim 1 wherein the second distribution application further comprises a second file repository for storing the data file.

6. The system according to claim 1 wherein the second distribution application further comprises a second file transfer client coupled to the second file repository, the second file transfer client for receiving the data file from the first distribution application.

7. The system according to claim 1 wherein the second distribution application further comprises a second file transfer server coupled to the second file repository, the second file transfer server for transferring the data file to any of the plurality of distribution applications in the system.

8. The system according to claim 1 wherein the first distribution application further comprises a first user interface for displaying a transfer status of the data file being transferred.

9. The system according to claim 1 wherein the second distribution application further comprises a second user interface for displaying a transfer status of the data file being transferred.

10. The system according to claim 1 further comprising a file index server coupled to the file index and the plurality of the distribution applications, wherein the file index server provides a file description of every data file in the file index to the plurality.

11. The system according to claim 10 further comprises an inventory module coupled to each of the plurality of distribution applications, the inventory module for detecting addition or removal of the data file from each of the plurality of distribution application's file repository, wherein the inventory module notifies the file index server of the addition or removal of the data file.

12. The system according to claim 10 further comprising means for the second distribution application to download a data file from a protected first distribution application, wherein the second distribution application transmits a download request message to the index server, wherein the index server forwards the download request message to the protected first distribution application and the protected first distribution application initiates a connection to the second distribution application, whereby the protected first distribution application transmits the data file to the second distribution application.

13. The system according to claim 10 further comprising an automatic selection module coupled to the file index, the automatic selection module for scoring the file description using a scoring technique, wherein the automatic selection module causes the second file transfer client to receive the data file from one of a plurality of file transfer servers having a best score.

14. The system according to claim 1, wherein the inventory module removes all additions or removals of file descriptions made by any of the plurality of distribution application to the file index when the distribution application adding or removing the file description is prematurely disconnected from the file index server.

15. The system according to claim 1 wherein any of the plurality of distribution applications further comprises a data file player module.

16. The system according to claim 1 wherein any of the plurality of distribution applications further comprises a data file converter module for converting the data file into a form audibly presentable to a user.

17. The system according to claim 1 wherein any of the plurality of distribution applications further comprises a data file converter module for converting the data file into a form visually presentable to a user.

18. The system according to claim 1 further comprising a parallel download module coupled to the second distribution application, wherein the second distribution application downloads different subsections of the data file simultaneously from at least two of the plurality of distribution applications in the system.

19. The system according to claim 18 wherein the at least two other distribution applications are selected using a scoring technique.

20. The system according to claim 1 further comprising a filter module for pruning the search response of file descriptions that do not meet a limitation criteria.

21. The system according to claim 20 wherein the limitation criteria comprises a bandwidth limitation, wherein the search response is pruned of file descriptions from distribution applications that have a bandwidth capability that is below the bandwidth limitation.

22. The system according to claim 1 further comprising means for pruning the search response of file descriptions contained in distribution applications that are unable to accept further download requests.

23. The system according to claim 1 further comprising a sort module for sorting the search response.

24. The system according to claim 23 wherein the search response is sorted using a responsiveness value, wherein the responsiveness value is determined by measuring the amount of time it takes for any of the plurality of distribution applications to reply to an echo request provided by the first distribution application.

25. The system according to claim 1 wherein the search response is pruned of file descriptions from any of the plurality of distribution applications that did not respond to the echo request within a predetermined period of time.

26. A system for distribution of a data file between a plurality of distribution applications in a community, the system comprising:
 a. a first distribution application further comprising:
   i. a first file repository, wherein the first file repository contains the data file;
   ii. a first file transfer server coupled to the first file repository, the first file transfer server for transferring the data file;
   iii. a first file transfer client coupled to the first file repository;
   iv. a first user interface coupled to the first transfer client and the first transfer server, the first user interface for displaying a transfer status of the data file being transferred; and
 b. a second distribution application further comprising:
   i. a second file repository;
   ii. a second file transfer client coupled to the second file repository, the second file transfer client for receiving the data file transferred from the first file transfer server, wherein the second file transfer client stores the data file received in the second file repository;
   iii. a second file transfer server coupled to the second file repository, wherein the second distribution application automatically makes available the data file stored in the second file repository to the plurality of distribution applications in the community; and
   iv. a second user interface coupled to the second transfer client and the second file transfer server, the second user interface for providing a form for a user to construct a search request for the data file.

27. The system according to claim 26 further comprising a file index coupled to the first distribution application and the second distribution application, wherein the file index contains a file description of every data file in the first data file repository and the second data file repository.

28. The system according to claim 27 further comprising a file index server coupled to the first distribution application and the second distribution application, wherein the file index server provides a file description of every data file in the file index.

29. The system according to claim 28 further comprising an inventory module coupled to the first file repository and the second file repository, the inventory module for detecting addition or removal of the data file from either file repository, wherein the inventory module notifies the file index server of the addition or removal of the data file.

30. A method for distributing a data file between a plurality of distribution applications in a community, the method comprising the steps of:
 a. obtaining a connection with one of the plurality of distribution applications in the system;
 b. requesting a data file from the one of the plurality of distribution applications;
 c. receiving the data file from the one of the plurality of distribution applications;
 d. storing the data file received into a data file repository, wherein the data file stored is automatically available to other distribution applications in the community;
 e. adding or removing a file description of the data file to a file index when the data file is added or removed from the data file repository, wherein the step of adding or removing a file description to a file index is performed through a file index server;
 f. submitting a search request to the file index, wherein the search request is for a particular data file;
 g. performing the search; and
 h. responding with a search response, wherein the search response further comprises a file description matching the search request, wherein the file description is associated with the particular data file.

31. The method according to claim 30 further comprising the step of audibly presenting to the user audio files located in the data file repository.

32. The method according to claim 30 further comprising the step of removing all additions or removals of the file description to the file index when the one of the plurality of distribution applications is prematurely disconnected with the file index server.

33. The method according to claim 30 wherein the one of the plurality of distribution applications is protected, the method further comprising the steps of:
 a. transmitting a download request message to the index server; and
 b. forwarding the download request message to the protected distribution application, wherein the protected distribution application obtains the connection to a requested distribution application and transmits the data file to the requesting distribution application.

34. The method according to claim 30 further comprising the step of visually presenting to the user audio files located in the data file repository.

35. The method according to claim 30 further comprising the step of pruning the search response for any of the plurality of distribution application that has a bandwidth capability that is below a bandwidth limitation.

36. The method according to claim 30 further comprising the step of pruning the search response of the file description for any of the plurality of distribution applications that will not accept further download requests.

37. The method according to claim 30 wherein the search response is sorted using a responsiveness value, wherein the responsiveness value is determined by measuring the amount of time it takes for to receive a reply to an echo request.

38. The method according to claim 37 wherein the search response prunes the file description from any of the plurality of distribution applications that do not respond to the echo message within a predetermined period of time.

39. The method according to claim 30 further comprising the step of scoring the file description using a scoring technique and receiving the data file from a file transfer server having a best score.

40. The method according to claim 30 wherein the distribution application downloads different subsections of the data file simultaneously from at least two of the plurality of distribution applications.

41. A method for distributing a data file between a plurality of distribution applications in a community, the method comprising the steps of:

a. securing a connection with one of the plurality of distribution applications in the system;
 b. receiving a request for a data file from the one of the plurality of distribution applications;
 c. retrieving the data file from a data file repository;
 d. transmitting the data file to the one of the plurality of distribution applications, wherein the data file transmitted is automatically available to other distribution applications in the community after the one of the plurality of distribution applications receives the data file transmitted;
 e. adding or removing a file description of the data file to a file index when the data file is added or removed from the data file repository, wherein the step of adding or removing a file description to a file index is performed through a file index server;
 f. submitting a search request to the file index, wherein the search request is for a particular data file;
 g. performing the search; and
 h. responding with a search response, wherein the search response further comprises a file description matching the search request, wherein the file description is associated with the particular data file.

42. The method according to claim 41 further comprising the step of removing all additions or removals of the file description to the file index when the one of the plurality of distribution applications is prematurely disconnected with the file index server.

43. The method according to claim 41 wherein the one of the plurality of distribution applications is protected, the method further comprising the steps of:

a. transmitting a download request message to the index server; and
 b. forwarding the download request message to the protected distribution application, wherein the protected distribution application obtains the connection to a requested distribution application and transmits the data file to the requesting distribution application.

44. The method according to claim 41 further comprising the step of audibly presenting to the user audio files located in the data file repository.

45. The method according to claim 41 further comprising the step of visually presenting to the user audio files located in the data file repository.

46. The method according to claim 41 further comprising the step of pruning the search response for any of the plurality of distribution applications that has a bandwidth capability that is below a bandwidth limitation.

47. The method according to claim 41 further comprising the step of pruning the search response of the file description for any of the plurality of distribution applications that will not accept further download requests.

48. The method according to claim 41 wherein the search response is sorted using a responsiveness value, wherein the responsiveness value is determined by measuring the amount of time it takes for to receive a reply to an echo request.

49. The method according to claim 48 wherein the search response prunes the file description from any of the plurality of distribution applications that do not respond to the echo message within a predetermined period of time.

50. The method according to claim 41 further comprising the step of scoring the file description using a scoring technique and receiving the data file from a file transfer server having a best score.

51. The method according to claim 41 wherein the distribution application downloads different subsections of the data file simultaneously from at least two of the plurality of distribution applications.

* * * * *